US007783891B2

(12) United States Patent
Perlin et al.

(10) Patent No.: US 7,783,891 B2
(45) Date of Patent: Aug. 24, 2010

(54) SYSTEM AND METHOD FACILITATING SECURE CREDENTIAL MANAGEMENT

(75) Inventors: Eric C. Perlin, Redmond, WA (US); Klaus U. Schutz, Kirkland, WA (US); Stefan N. Richards, Sammamish, WA (US); Sermet Iskin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1025 days.

(21) Appl. No.: 10/787,871

(22) Filed: Feb. 25, 2004

(65) Prior Publication Data

US 2005/0188210 A1 Aug. 25, 2005

(51) Int. Cl.
*G06F 21/00* (2006.01)
*H04L 9/32* (2006.01)
(52) U.S. Cl. .................. 713/183; 713/170; 713/184
(58) Field of Classification Search .......... 713/170, 713/183, 184
See application file for complete search history.

(56) References Cited

U.S. PATENT DOCUMENTS

| 4,885,789 A | 12/1989 | Burger et al. |
| 4,918,653 A | 4/1990 | Johri et al. |
| 4,945,468 A | 7/1990 | Carson et al. |
| 6,006,333 A * | 12/1999 | Nielsen .................. 726/8 |
| 6,389,535 B1 * | 5/2002 | Thomlinson et al. ........ 713/165 |
| 6,507,909 B1 * | 1/2003 | Zurko et al. ................ 713/164 |
| 7,036,022 B1 * | 4/2006 | Zurko et al. .................. 726/5 |
| 2003/0065940 A1 | 4/2003 | Brezak et al. |
| 2004/0221045 A1 * | 11/2004 | Joosten et al. .............. 709/227 |
| 2008/0214210 A1 * | 9/2008 | Rasanen et al. .......... 455/456.3 |

OTHER PUBLICATIONS

Steven R. Balmer, et al., Analysis of Terminal Server Architectures for Thin Clients in a High Assurance Network, 23rd National Information Systems Security Conference, 2000, 11 pages.
Suvo Mittra, et al., A Flow-Based Approach to Datagram Security, SIGCOMM '97, 1997, pp. 221-234, Cannes, France.

* cited by examiner

*Primary Examiner*—Kimyen Vu
*Assistant Examiner*—Suman Debnath
(74) *Attorney, Agent, or Firm*—Wolf, Greenfield & Sacks, P.C.

(57) ABSTRACT

A system and method facilitating secure credential management is provided. An aspect of the present invention provides for a credential management system including a credential user interface component, a trusted proxy component and a secure user interface component. The system can facilitate the secure acquisition, storage and/or application of credential(s) for a user (e.g., when accessing a particular resource) through a secure, isolated environment. For example, the system can be a core building block for operating system component(s) and/or application(s) that handle credential(s) in a secure manner.

24 Claims, 10 Drawing Sheets

SYSTEM AND METHOD FACILITATING SECURE CREDENTIAL MANAGEMENT

TECHNICAL FIELD

The present invention relates generally to computer system(s) and, more particularly, to a system and method facilitating secure credential management.

BACKGROUND OF THE INVENTION

Computer user(s) are inundated with prompts to enter credentials to authenticate themselves for access to such things as email, bank accounts, subscription websites, and online chat services. Credentials (e.g., passwords, PINs, etc) are conventionally collected in an insecure environment (e.g., user's desktop) which is vulnerable to spoofing and hooking attack(s). Conventionally, user(s) enter these credentials into whatever prompt is presented without a way to tell who or what is actually requesting the credentials. For example, a simple manipulation of the user interface can make any prompt look like it is coming from someone or something the user trusts. This makes it trivial for a 'spoofing' application to collect credentials from a user without their knowledge.

Further, conventionally, credentials stored for a user can be retrieved by applications running under the user's context without his knowledge. While this contributes to the single sign on approach, certain sensitive credential(s) (e.g., bank account number) can implicate stronger controls for security purposes.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system and method facilitating secure credential management. In accordance with an aspect of the present invention, a credential management system including a credential user interface component, a trusted proxy component and a secure user interface component is provided.

The system can facilitate the secure acquisition, storage and/or application of credential(s) for a user (e.g., when accessing a particular resource) through a secure, isolated environment. For example, the system can be a core building block for operating system component(s) and/or application(s) that handle credential(s) in a secure manner.

In accordance with an aspect of the present invention, a user is prompted to enter a secure attention sequence (e.g., a special keystroke captured in the kernel of the operating system) prior to the entry of a credential, to ensure that the operating system has generated the prompt, and not a rogue application.

The system can further facilitate prompting for credential(s) in a secure (e.g., isolated) environment (e.g., secure desktop) where user application(s) cannot be executed. This can protect against rogue user applications spying on entry prompts as the user enters their credential.

The credential user interface component can receive a request for a credential (e.g., from application(s) needing credential(s)). In response to the request for the credential, the credential user interface component can prompt a user to enter a secure attention sequence (e.g., control-alt-delete). The secure attention sequence can be entered by the physical user and captured at the kernel level to be handled by a trusted operating system component, for example, the trusted proxy component (e.g., via a trusted path). The use of a user secure attention sequence (e.g., a special keystroke captured in the kernel of the operating system) prior to the entry of a credential can, for example, ensure that the operating system has generated the prompt.

The user entering of the secure attention sequence can trigger the trusted proxy component to switch to a secure environment (e.g., secure desktop) and initiate a credential prompt via the secure user interface component. Thus, the trusted proxy component invokes the secure user interface component in the secure environment in response to the secure attention sequence. The secure user interface component prompts a user to enter information associated with a credential in the secure environment.

Thus, the credential gathering user interface is isolated from substantially all of the user application(s) running in the other desktop(s). Application(s) on the user desktop cannot send message(s) directly to this prompt, nor can they spy on it with user interface hooking. After the credential is entered, the trusted proxy component can return the credential, for example, to the calling application.

Yet another aspect of the present invention provides for secure storage of user credential(s) to reduce the number of times that credential entry needs to be done. This can greatly improve the user experience since they do not have to go through the secure entry sequence constantly.

In accordance with another aspect of the present invention, an optional secure confirmation feature is provided. A user is allowed to designate one or more credential(s) for which user confirmation is required prior to transmittal of a stored credential. Thus, the user can confirm the use of sensitive credential(s) using a trusted mechanism (e.g., similar to those used to enter the credential).

Thus, the system can facilitate secure confirmation prior to the use of credential(s) (e.g., based on user request). A user can select one or more credential(s) for which secure confirmation is required. For example, the user can be provided with information regarding the application requesting the credential (e.g., application "abc" is requesting credential "def"). The user can be prompted with a "yes/no" question on the secure desktop.

In one example, when a request for a stored credential for which secure confirmation is required is received, the credential user interface component can prompt a user to enter a secure attention sequence (e.g., control-alt-delete). Entry of the secure attention sequence triggers the trusted proxy component to switch to a secure environment (e.g., secure desktop) and initiate a prompt via the secure user interface component (e.g., YES/NO question on the secure desktop). Upon receipt of the proper response, information associated with the requested credential can be provided by the credential manager to the trusted proxy component. The trusted proxy component can provide information associated with the requested credential to the credential user interface component which in turn can provide the information to the requesting application.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

As used in this application, "credential" refers to data used to verify the identity of an entity (e.g., a user). For example, credential(s) can be employed to access email, bank account(s), subscription website(s) and online chat service(s). The "term" credential includes, but is not limited to, password(s), personal identification number(s) (PIN(s)), secret key(s), digital certificate(s), account number(s), account information, secret personal information, response(s) to personal question(s), response(s) to challenge(s) requiring a separate device to calculate the proper response, and/or biometric data.

Figure 1:
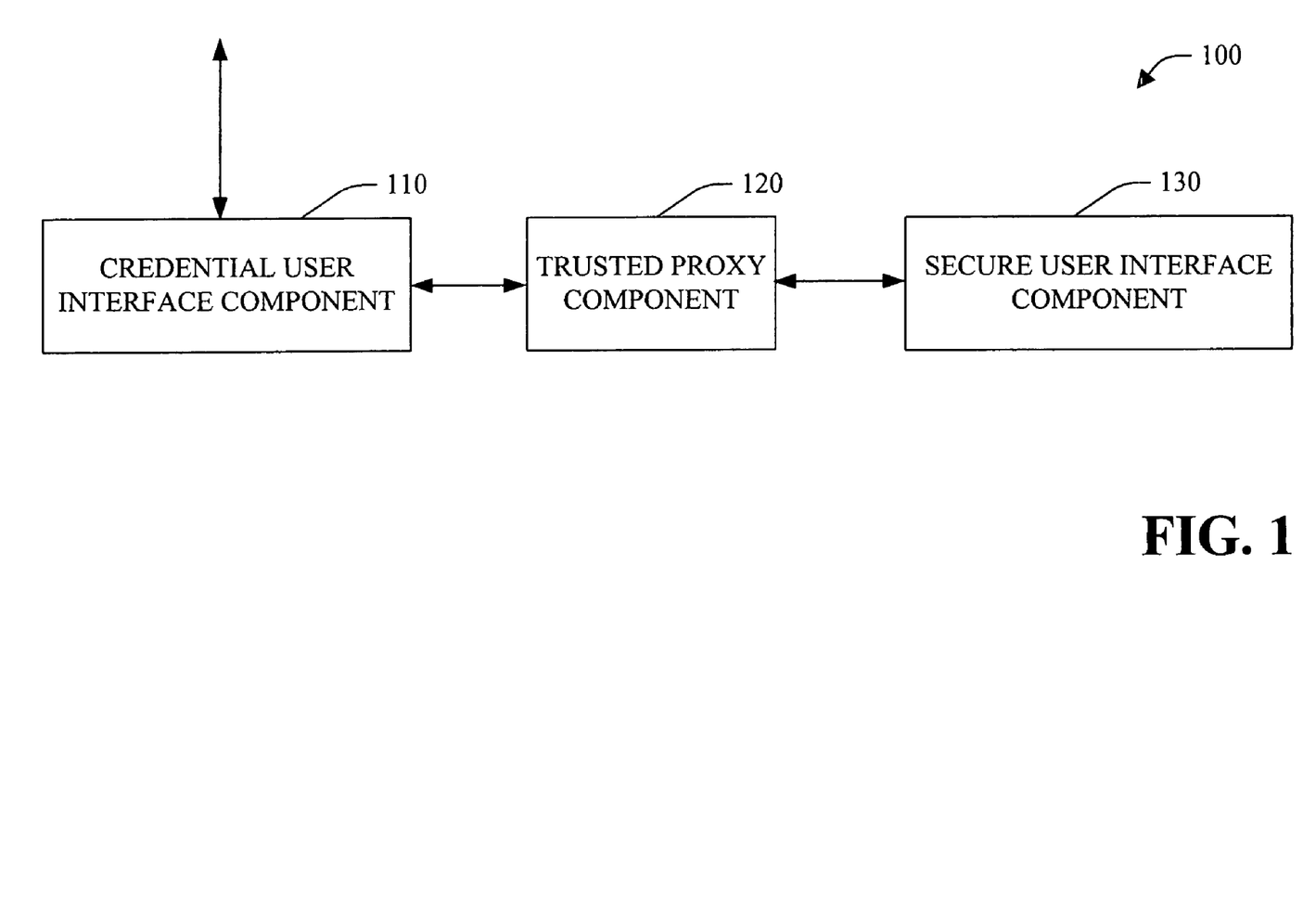
FIG. 1 is a block diagram of a credential management system in accordance with an aspect of the present invention.

Referring to FIG. 1, a credential management system 100 in accordance with an aspect of the present invention is illustrated. The system 100 includes a credential user interface component 110, a trusted proxy component 120 and a secure user interface component 130.

The system 100 can facilitate the secure acquisition, storage and/or application of credential(s) for a user (e.g., when accessing a particular resource) through a secure, isolated environment. For example, the system 100 can be a core building block for operating system component(s) and/or application(s) that handle credential(s) in a secure manner.

Conventionally, credential(s) are collected through credential user interface application program interface(s) on a user's desktop which can be, for example, subject to spoofing and/or windowing attacks. The system 100 facilitates collection of credential(s) in a secure environment (e.g., secure desktop), for example, to mitigate spoofing and/or windowing attacks.

The credential user interface component 110 can receive a request for a credential (e.g., from application(s) needing credential(s)). In response to the request for the credential, the credential user interface component 110 can prompt a user to enter a secure attention sequence (e.g., control-alt-delete). The secure attention sequence is entered by the physical user and captured at the kernel level to be handled by a trusted operating system component, for example, the trusted proxy component 120 (e.g., via a trusted path). The use of a user secure attention sequence (e.g., a special keystroke captured in the kernel of the operating system) prior to the entry of a credential can, for example, ensure that the operating system has generated the prompt, not a rogue application.

The user entering of the secure attention sequence can trigger the trusted proxy component 120 to switch to a secure environment (e.g., secure desktop) and initiate a credential prompt via the secure user interface component 130. Thus, the trusted proxy component 120 invokes the secure user interface component 130 in the secure environment in response to the secure attention sequence. The secure user interface component 130 prompts a user to enter information associated with a credential in the secure environment.

Thus, the credential gathering user interface is isolated from substantially all of the user application(s) running in the other desktop. Application(s) on the user desktop cannot send message(s) directly to this prompt, nor can they spy on it with user interface hooking. After the credential is entered, the trusted proxy component 120 can return the credential, for example, to the calling application.

Optionally, the trusted proxy component 120 can further receive identification information associated with a calling process (e.g., application). The trusted proxy component 120 can verify the identification of the calling process. Thereafter, the trusted proxy component 120 can provide at least some of the identification information associated with the calling process to the secure user interface component 130.

The secure user interface component 130 can display at least some of the identification information, for example, to a user. Thus, when the user sees the identification information, the user knows it is the actual identity of the calling process as verified by the operating system rather than simply an identifier provided by a potential rogue application.

Further, if the application is also signed by a trusted entity the assertion displayed by the secure user interface component 130 can be made even stronger—displaying information to the user to indicate the application is not only named a certain name, but also its code was signed by a trusted authority and has not changed since signing. This helps mitigate a bad application using the same infrastructure to prompt for and collect secrets.

It is to be appreciated that the system 100, the credential user interface component 110, the trusted proxy component 120 and/or the secure user interface component 130 can be computer components as that term is defined herein.

Figure 2:
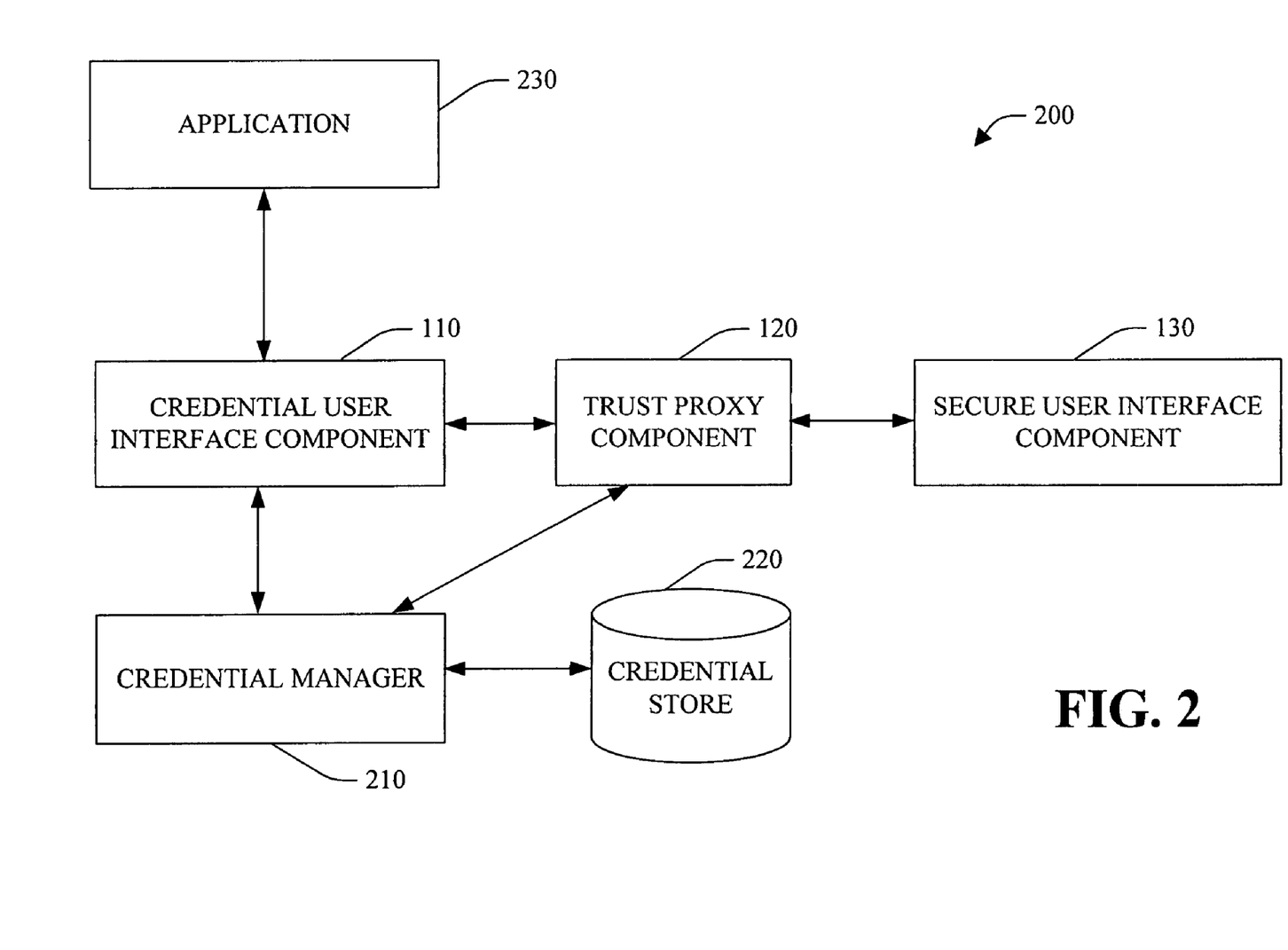
FIG. 2 is a block diagram of a credential management system in accordance with an aspect of the present invention.

Turning next to FIG. 2, a credential management system 200 in accordance with an aspect of the present invention is illustrated. The system 200 includes a credential user interface component 110, a trusted proxy component 120, a secure user interface component 130, a credential manager 210 and a credential data store 220.

The system 200 can facilitate secure storage of user credential(s), for example, to reduce the number of times that credential entry needs to be done. The system 200 can greatly improve the user experience since the user does not have to go through the secure entry sequence constantly.

After receiving a credential from a user, the trusted proxy component 120 and/or the credential user interface component 110 provide information associated with the credential to the credential manager 210. The credential manager 210 then stores at least some of the information associated with the credential in the credential data store 220. The credential store 220 can provide a secure store for credential(s). For example, the credential can be encrypted and stored within an operating system. Accordingly, the credential itself remains in a secure domain thus further facilitating security of the credential.

In this example, when a request for a credential is received by the credential user interface component 110 (e.g., from an application 230), the credential user interface component 110 can first determine whether the credential is stored in the credential store 220, for example, by a remote procedure call to the credential manager 210. If the credential is stored in the credential store 220, the credential manager 210 can provide information associated with the credential (e.g., the credential itself, an encrypted credential and/or a reference to the credential) to the credential user interface component 110. In turn, the credential user interface component can provide information associated with the credential, for example, to the application 230. If the credential is not stored in the credential store 220, the credential user interface component 110 can acquire the credential from the user via the trusted proxy component 120 and the secure user interface component 130 as discussed previously.

It is to be appreciated that the system 200, the credential manager 210 and/or the credential store 230 can be computer components as that term is defined herein.

Figure 3:
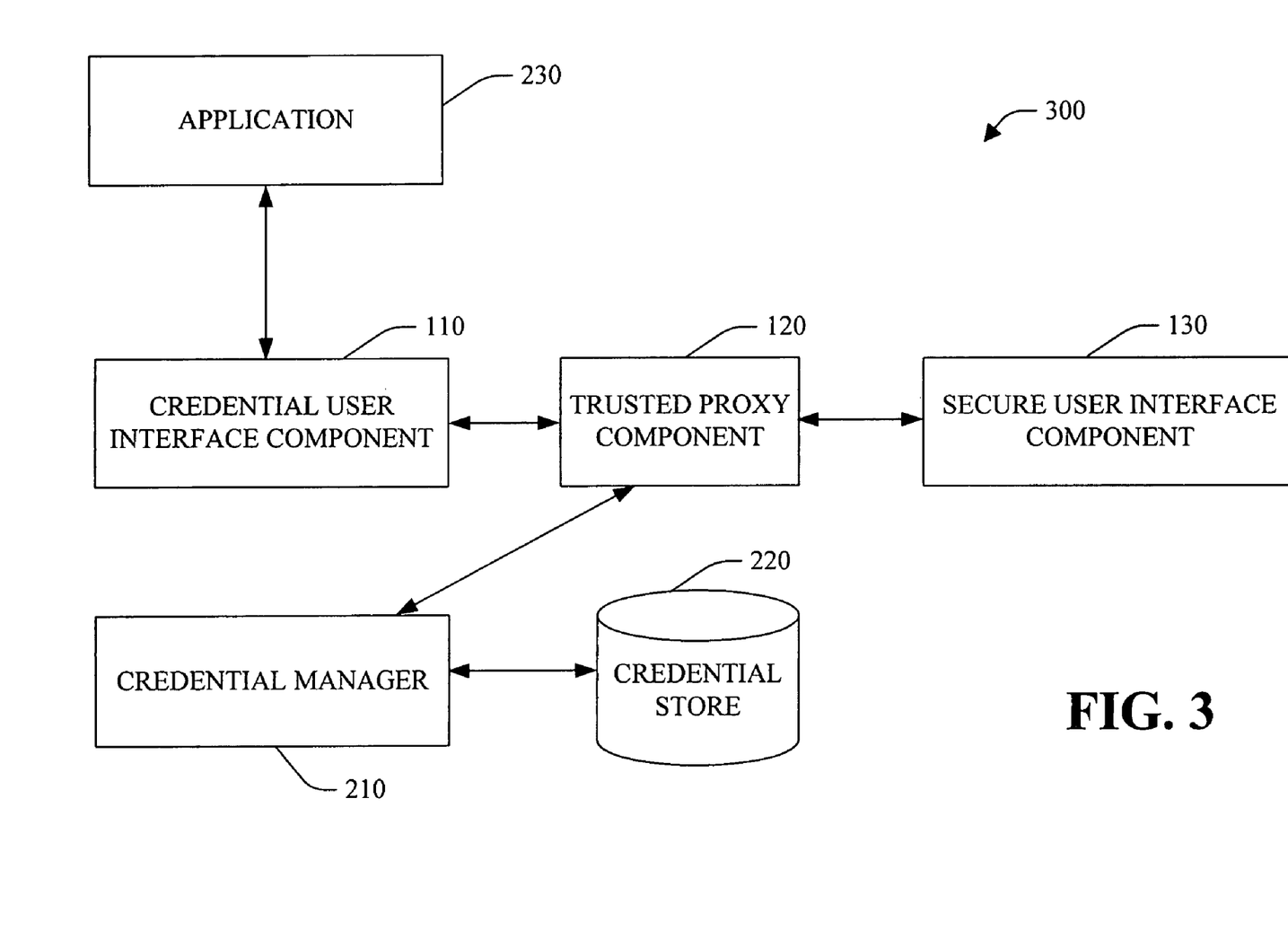
FIG. 3 is a block diagram of a credential management system in accordance with an aspect of the present invention.

Turning to FIG. 3, a credential management system 300 in accordance with an aspect of the present invention is illustrated. The system 300 includes a credential user interface component 110, a trusted proxy component 120, a secure user interface component 130, a credential manager 210 and a credential data store 220.

The system 300 can allow user(s) to identify that one or more credential(s) require confirmation when the respective credential(s) are accessed. Application(s) can be provided a secure generic confirmation feature to enable the application(s) to prevent against scripting attacks. For example, the confirmation can be performed in a secure environment (e.g., secure desktop). Thus, the system 300 allows user to discern with great confidence what process has requested a credential by requiring action from the user that cannot be automated. Further, it ensures that the requester of the credential is the one that gets the credential (e.g., that no spying rogue application can capture the credential as it is being entered).

The system 300 can facilitate secure confirmation prior to the use of credential(s) (e.g., based on user request). A user can select one or more credential(s) for which secure confirmation is required. For example, the user can be provided with information regarding the application requesting the credential (e.g., application "abc" is requesting credential "def"). The user can be prompted with a "yes/no" question on the secure desktop.

In one example, when a request for a stored credential for which secure confirmation is required is received, the credential user interface component 110 can prompt a user to enter a secure attention sequence (e.g., control-alt-delete). Entry of the secure attention sequence triggers the trusted proxy component 120 to switch to a secure environment (e.g., secure desktop) and initiate a prompt via the secure user interface component 130 (e.g., YES/NO question on the secure desktop). Upon receipt of the proper response, information associated with the requested credential can be provided by the credential manager 210 to the trusted proxy component 120. The trusted proxy component 120 can provide information associated with the requested credential to the credential user interface component 110 which in turn can provide the information to the requesting application 230.

Optionally, the trusted proxy component 120 can further receive identification information associated with a calling process (e.g., application). The trusted proxy component 120 can verify the identification of the calling process. Thereafter, the trusted proxy component 120 can provide at least some of the identification information associated with the calling process to the secure user interface component 130.

The secure user interface component 130 can display at least some of the identification information. Thus, when the user sees the identification information, the user knows it is the actual identity of the calling process as verified by the operating system rather than simply an identifier provided by a potential rogue application.

Further, if the application is also signed by a trusted entity the assertion displayed by the secure user interface component 130 can be made even stronger—displaying information to the user to indicate the application is not only named a certain name, but also its code was signed by a trusted authority and has not changed since signing. This helps mitigate a bad application using the same infrastructure to prompt for and collect secrets.

It is to be appreciated that the system 300 can be a computer component as that term is defined herein.

Figure 3A:
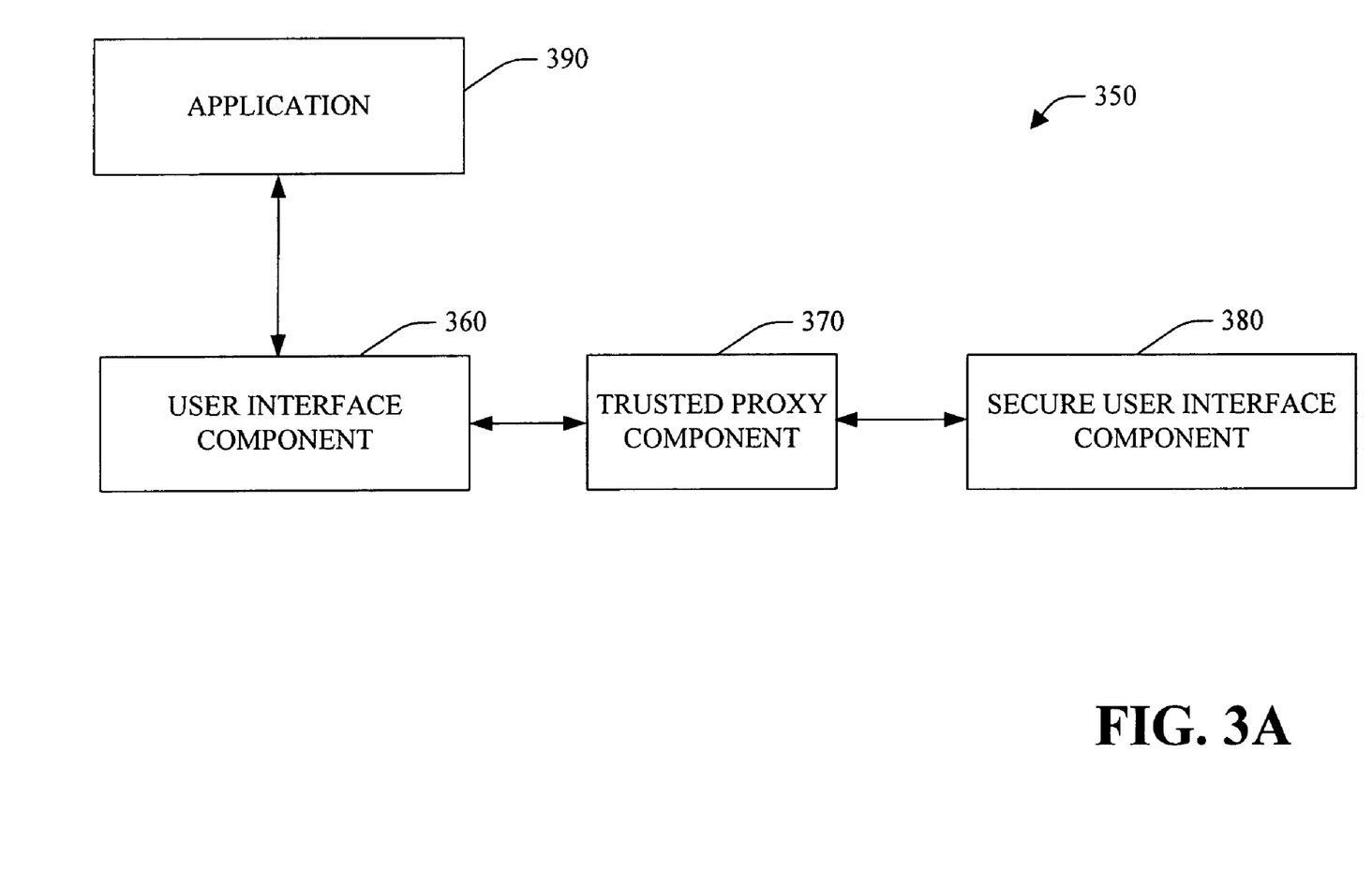
FIG. 3A is a block diagram of a secure confirmation system in accordance with an aspect of the present invention.

Referring next to FIG. 3A, a secure confirmation system 350 in accordance with an aspect of the present invention is illustrated. The system 350 includes a user interface component 360, a trusted proxy component 370 and a secure user interface component 380.

The system 350 can provide support for a generic confirmation operation on the secure desktop. Application(s) 390 which need to collect a confirmation input (e.g., "yes/no", "ok/cancel" and/or the like) from the user securely can call into the user interface component 360 to prompt the user on the secure desktop (e.g., to prevent against scripting attacks). For example, the application 390 can provide information associated with the confirmation process (e.g., text to be displayed), and, the user interface component 360 can return the user's selection.

The user interface component 360 prompts a user to enter a secure attention sequence, as discussed previously. In response to the secure attention sequence, the trusted proxy component 370 invokes the secure user interface component 380 in a secure environment.

The secure user interface component 380 prompts a user for a confirmation response. The secure user interface component 380 further receives the user's confirmation response. The secure user interface component 380 can provide the user's confirmation response to the trusted proxy component 370 which can provide the user's response to the user interface component 360. Thereafter, the user interface component 360 can provide the user's confirmation response to the application(s) 390.

It is to be appreciated that the system 350, the user interface component 360, the trusted proxy component 370 and/or the secure user interface component 380 can be a computer component as that term is defined herein.

Turning briefly to FIGS. 4-8, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 4:
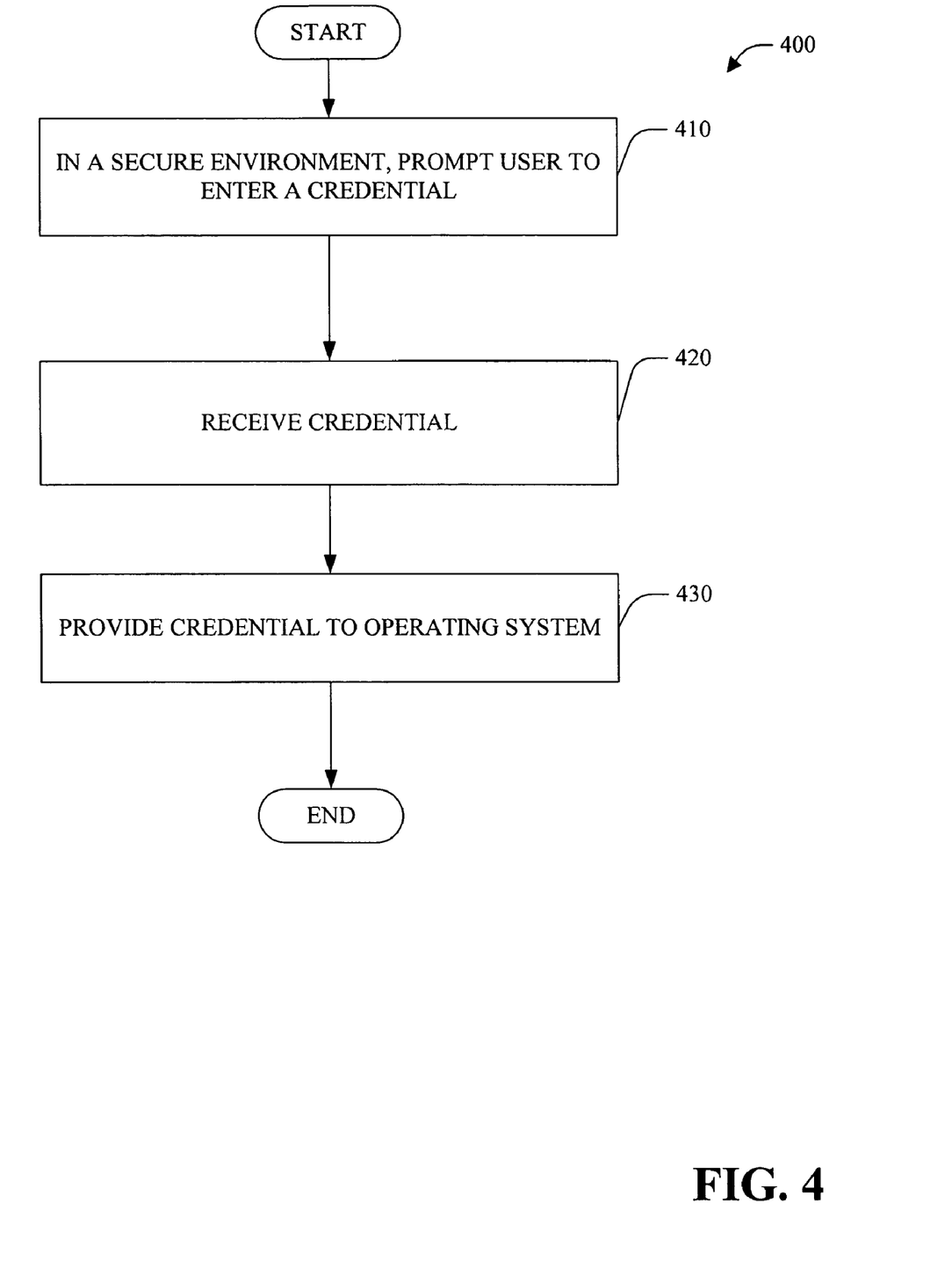
FIG. 4 is a flow chart of a method facilitating credential management in accordance with an aspect of the present invention.

Referring to FIG. 4, a method facilitating credential management 400 in accordance with an aspect of the present invention is illustrated. At 410, a user is prompted to enter a credential in a secure environment. At 420, the credential is received. At 430, the credential is provided to the operating system.

Figure 5:
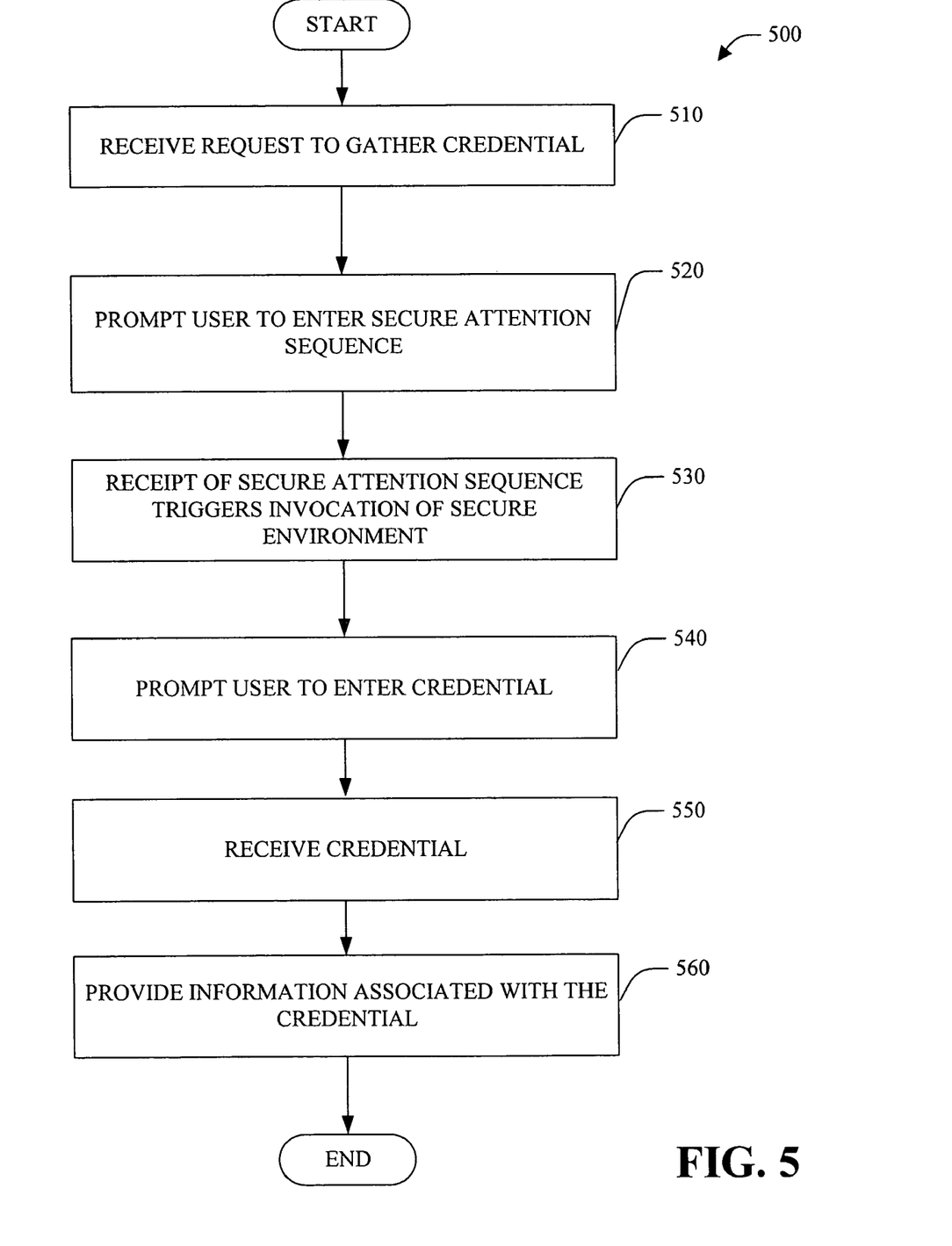
FIG. 5 is a flow chart of a method facilitating credential management in accordance with an aspect of the present invention.

Next, turning to FIG. 5, a method facilitating credential management 500 in accordance with an aspect of the present invention is illustrated. At 510, a request to gather a credential is received (e.g., from an application). At 520, a user is prompted to enter a secure attention sequence (e.g., control-alt-delete and/or particular hardware key/button).

At 530, receipt of the secure attention sequence triggers invocation of a secure environment (e.g., secure desktop). At 540, the user is prompted to enter the credential. At 550, the credential is received. At 560, information associated with the credential is provided, for example, to a credential manager 210 and/or an application 230.

Figure 6:
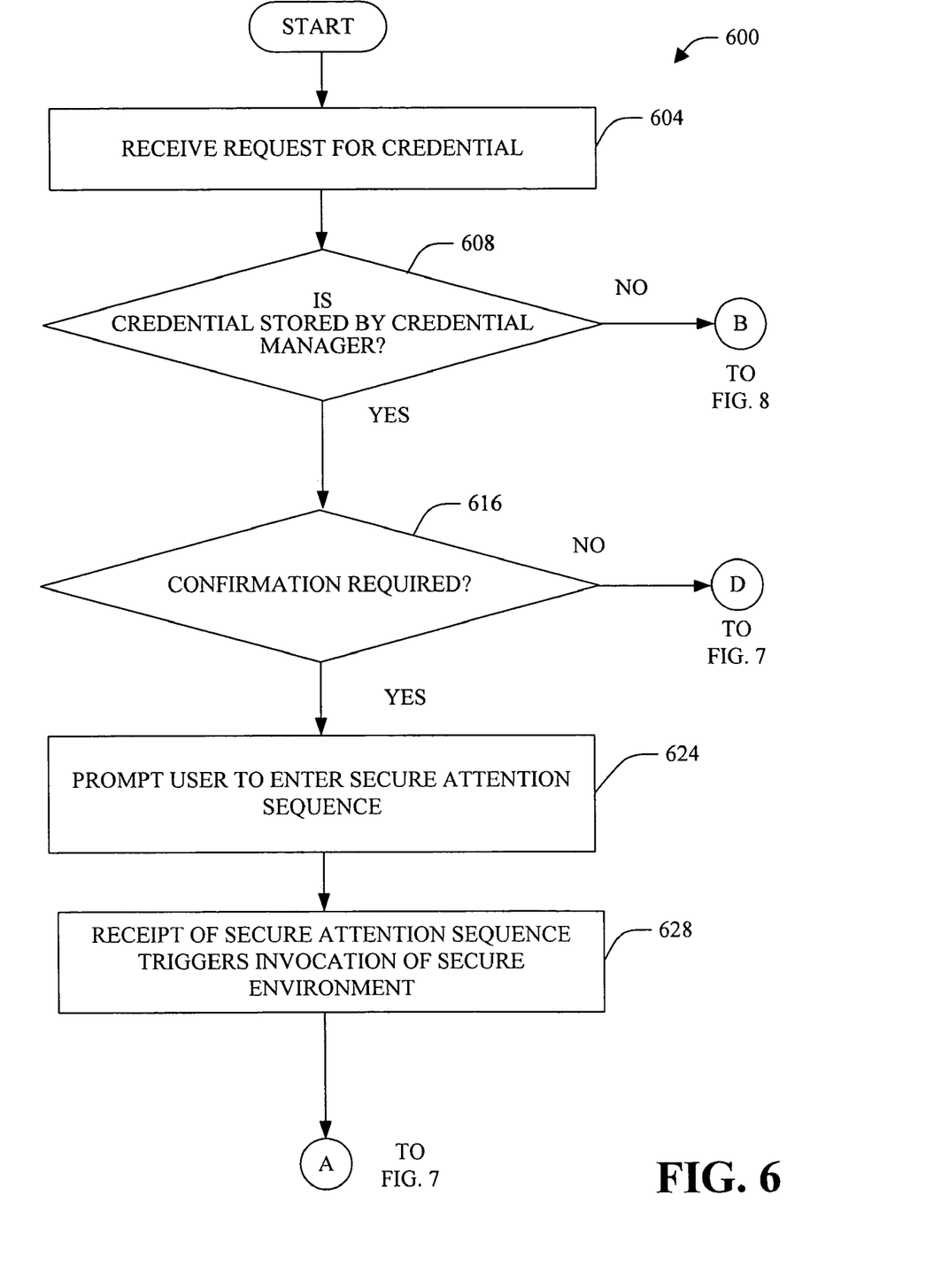
FIG. 6 is a flow chart of a method facilitating credential management in accordance with an aspect of the present invention.
Figure 7:
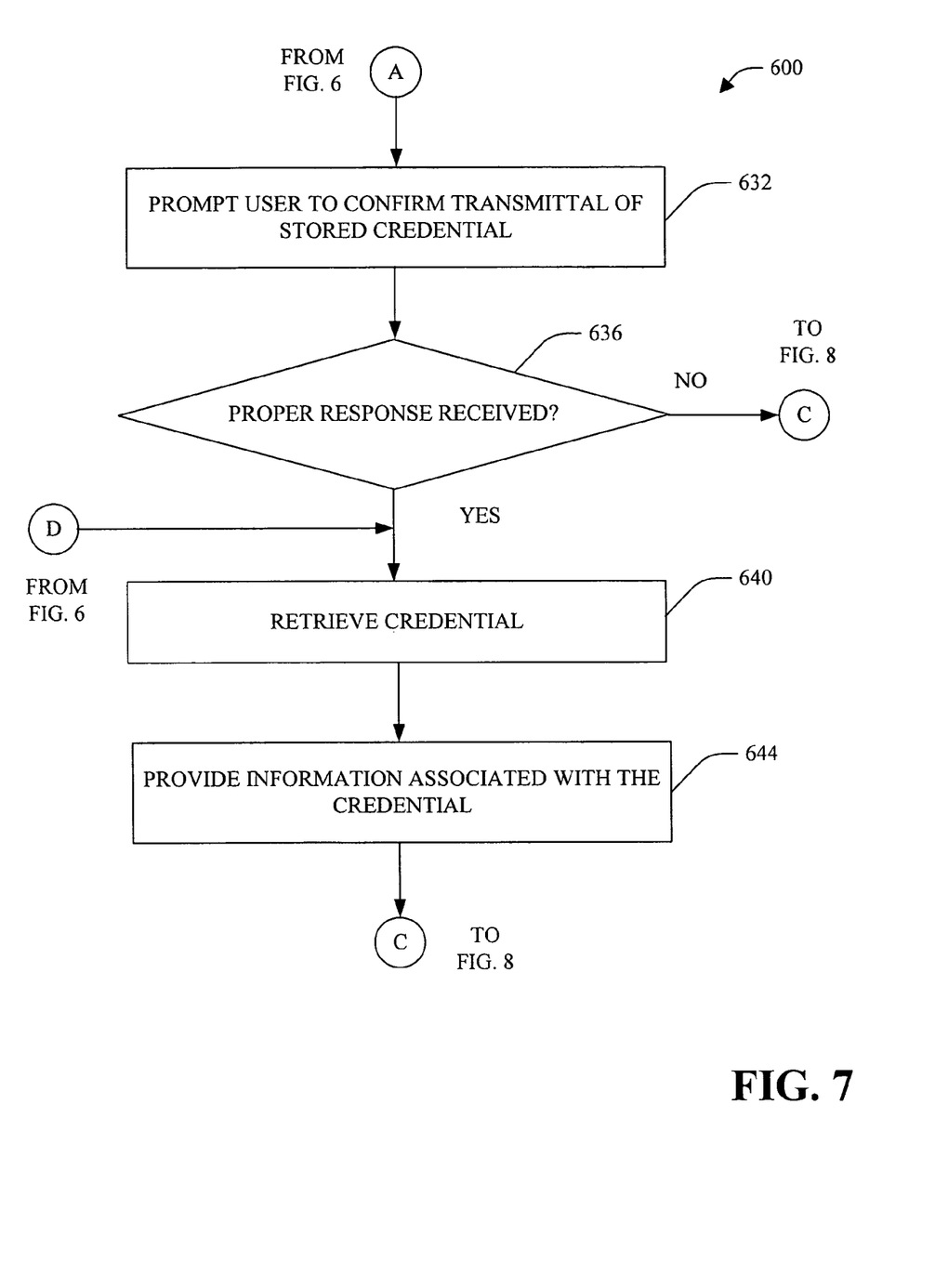
FIG. 7 is a flow chart further illustrating the method of FIG. 6.
Figure 8:
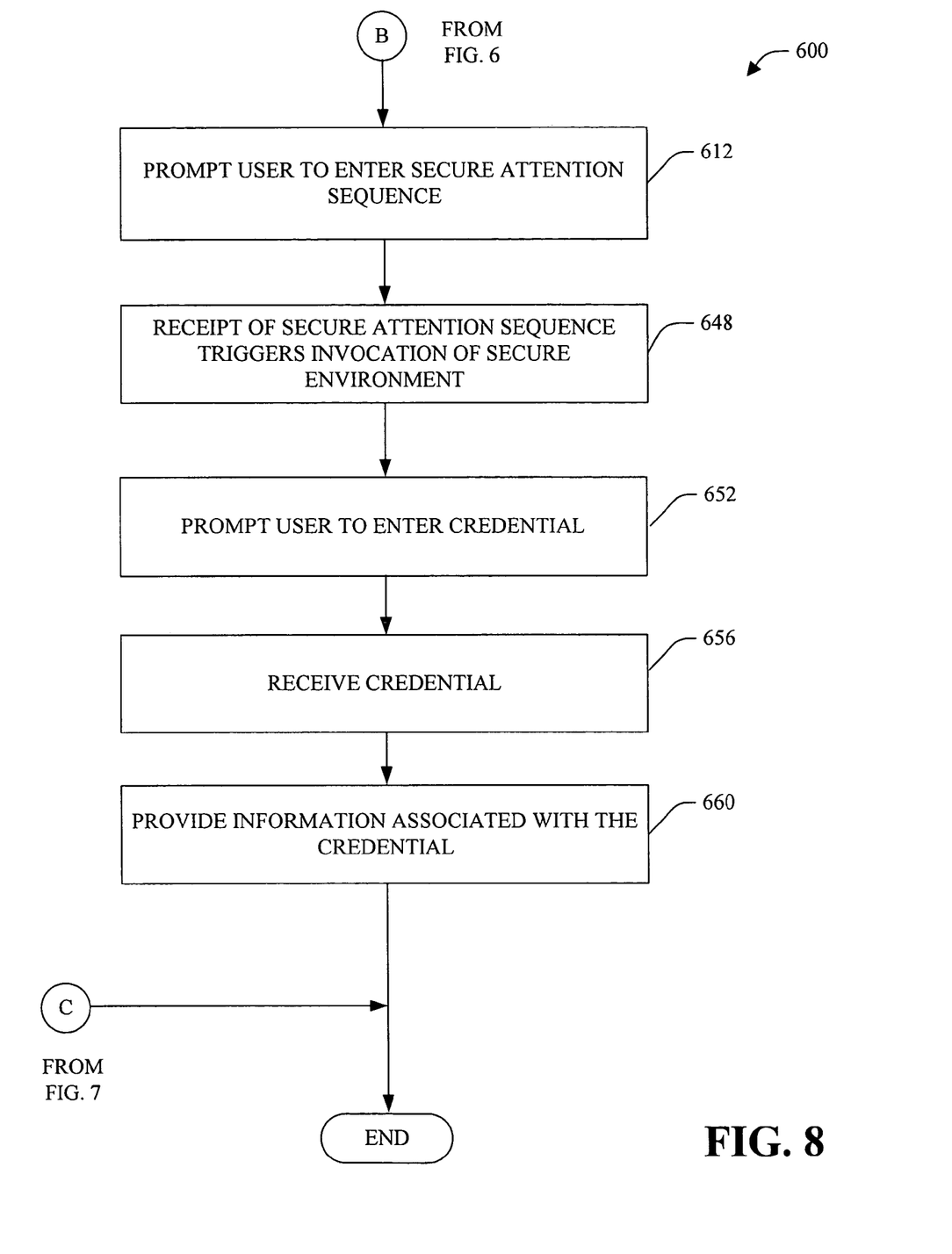
FIG. 8 is a flow chart further illustrating the method of FIGS. 6 and 7.

Referring to FIGS. 6-8, a method facilitating credential management 600 in accordance with an aspect of the present invention is illustrated. At 604, a request for a credential is received (e.g., from an application). At 608, a determination is made as to whether the credential is stored by a credential manager. If the determination at 608 is NO, processing continues at 612.

If the determination at 608 is YES, at 616, a determination is made as to whether confirmation is required (e.g., based on a user's preference). If the determination at 616 is NO, processing continues at 620.

If the determination at 616 is YES, at 624, a user is prompted to enter a secure attention sequence (e.g., control-alt-delete and/or particular hardware key/button). At 628, receipt of the secure attention sequence triggers invocation of a secure environment.

At 632, a user is prompted to confirm transmittal of the stored credential. At 636, a determination is made as to whether a proper response was received. If the determination at 636 is NO, no further processing occurs. If the determination at 636 is YES, at 640, the credential is retrieved, for example, via the credential manager. At 644, information associated with the credential (e.g., the credential itself, an encrypted credential and/or a reference to the credential) is provided (e.g., to the application), and, no further processing occurs.

At 612, the user is prompted to enter a secure attention sequence. At 648, receipt of the secure attention sequence triggers invocation of a secure environment (e.g., secure desktop). At 652, the user is prompted to enter the credential. At 656, the credential is received. At 660, information associated with the credential is provided (e.g., to the credential manager and/or application), and, no further processing occurs.

Figure 9:
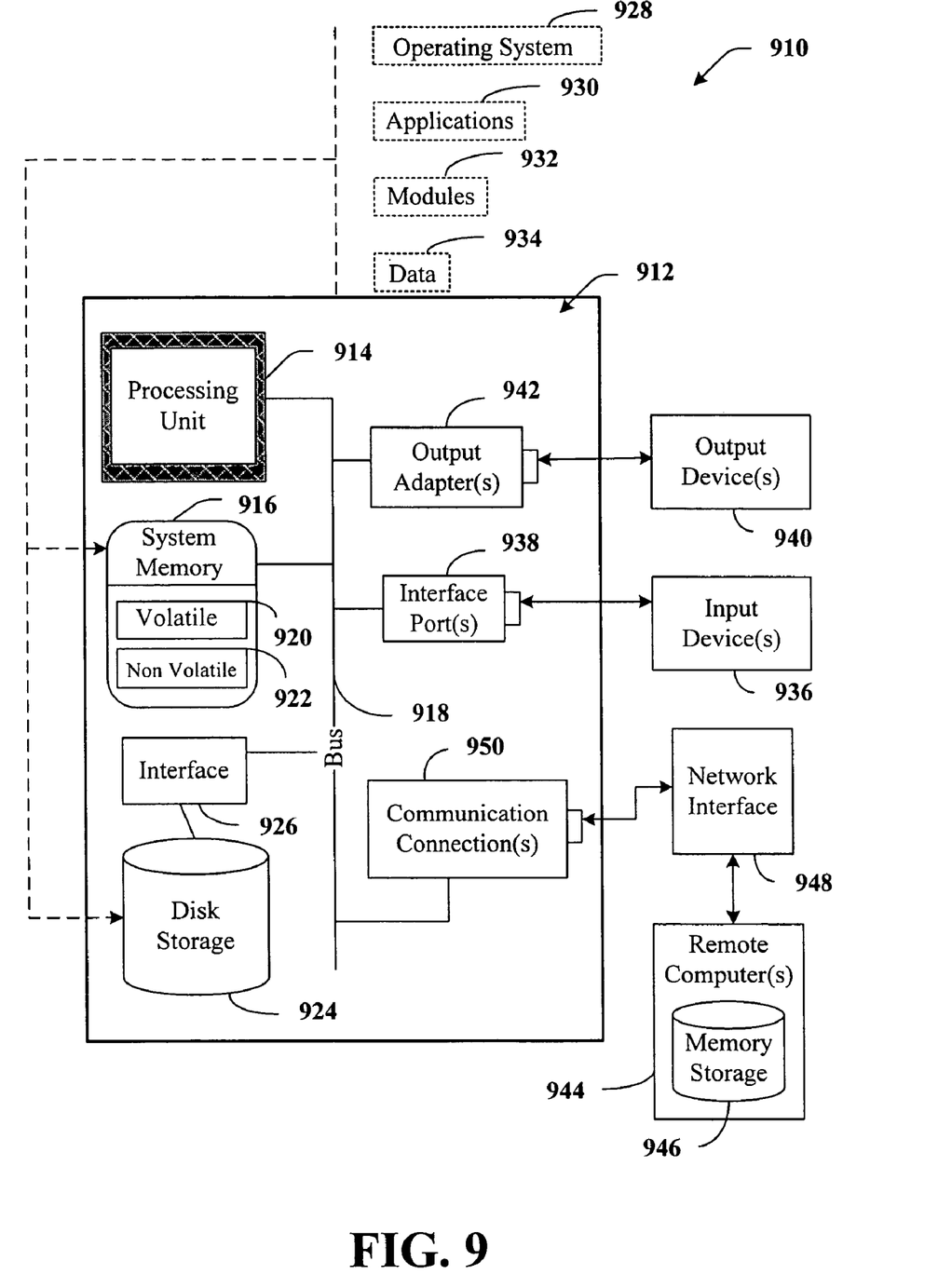
FIG. 9 illustrates an example operating environment in which the present invention may function.

In order to provide additional context for various aspects of the present invention, FIG. 9 and the following discussion are intended to provide a brief, general description of a suitable operating environment 910 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 910 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multi-processor systems, microprocessor-based systems, programmable consumer electronics, network PCs, minicomputers, mainframe computers, distributed computing environments that include the above systems or devices, and the like.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/nonremovable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A credential management system comprising:
    a processor executing computer executable instructions to provide:
        a desktop user environment;
        a credential user interface component operating on the desktop user environment that prompts a user to enter a secure attention sequence to thwart malicious applications locally executed that can perform spoofing or hooking attacks;
        a trusted proxy component that invokes a secure user interface component in a secure environment in response to the secure attention sequence substantially isolating from all user applications running on the desktop user environment, the secure user interface component prompts the user to enter a credential, the secure user interface component receiving the credential;

a credential store that stores the credential;

an authenticating component that authenticates identification information associated with a calling process as unchanged since being signed by a trusted authority, the secure user interface component displaying the authenticated identification information via the secure environment, the authenticated identification information being displayed comprising a verified name of the calling process and an indication that the calling process is unchanged since being signed by the trusted authority; and a credential manager that facilitates access to the credential store by a remote calling process dependent upon a user permission input made via the secure user interface component to balance network security with user convenience.

2. The system of claim 1, the prompt of the credential user interface component being based, at least in part, upon receipt of a request to gather the credential.

3. The system of claim 1, the secure user interface component providing information associated with the credential to the trusted proxy component.

4. The system of claim 3, the trusted proxy component providing the information associated with the credential to the credential user interface component.

5. The system of claim 3, the trusted proxy component providing the information associated with the credential to an application.

6. The system of claim 1, the secure attention sequence comprising a combination of keyboard keys.

7. The system of claim 6, the secure attention sequence comprising a combination of a control key, an alt key and a delete key.

8. The system of claim 1, further comprising the credential store storing information associated with the credential.

9. The system of claim 8, the stored information associated with the credential comprising whether user confirmation is required.

10. The system of claim 1, the credential being encrypted before it is stored in the credential store.

11. The system of claim 1, the secure attention sequence comprising a hardware key and/or button.

12. The system of claim 1, the credential comprising at least one of a password, a personal identification number, a secret key, a digital certificate, an account number, account information, secret personal information, a response to a personal question, a response to a challenge requiring a separate device to calculate the proper response and biometric data.

13. A method facilitating credential management comprising:
operating a processor to perform a method comprising:
(a) providing a desktop user environment;
(b) receiving at a credential user interface component of a credential management system a request for a credential from a calling process;
(c) determining whether the credential is stored in a credential store;
(d) when it is determined that the credential is stored in a credential store:
(I) determining based on a user preference whether user confirmation is required to access the credential; and
(II) when it is determined that user confirmation is required to access the credential:
(i) prompting a user to enter a secure attention sequence;
(ii) entering a secure environment upon receipt of the secure attention sequence; and
(iii) displaying a prompt to the user to confirm transmittal of the credential to the calling process, the prompt comprising authenticated identification information for the calling process; and
(III) when it is determined that user confirmation is not required to access the credential:
(i) providing the credential to the calling process; and
(e) when it is determined that the credential is not stored in a credential store:
(I) prompting the user to enter a secure attention sequence, receipt of the secure attention sequence triggering invocation of the secure environment;
(II) prompting the user to enter a credential in the secure environment operating on the desktop user environment, the secure environment substantially isolating from all user applications running on the desktop user environment to thwart malicious applications locally executed that can perform spoofing or hooking attacks;
(III) receiving the credential from the user in the secure environment;
(IV) providing the credential to an operating system;
(V) storing the credential;
(VI) authenticating identification information associated with the calling process as unchanged since being signed by a trusted authority;
(VII) displaying the authenticated identification information of the calling process to the user via the secure environment, the authenticated identification information being displayed comprising a verified name of the calling process and an indication that the calling process is unchanged since being signed by the trusted authority; and
(VIII) selectively providing the credential to the calling process responsive to permission by the user.

14. The method of claim 13 further comprising at least one of the following acts:
receiving a request to gather the credential; and
storing the credential in response to determining that the credential is not already stored.

15. The method of claim 13 further comprising encrypting and storing the credential securely.

16. The method of claim 13, the credential comprising at least one of a password, a personal identification number, a secret key, a digital certificate, an account number, account information, secret personal information, a response to a personal question, a response to a challenge requiring a separate device to calculate the proper response and biometric data.

17. The method of claim 13, further comprising:
when it is determined that the credential is stored in a credential store and it is determined that user confirmation is required to access the credential:
(iv) providing information associated with the stored credential upon receipt of confirmation from the user.

18. The method of claim 17, the information associated with the stored credential comprising one of the credential, an encrypted credential and a reference to the credential.

19. The method of claim 17, the credential comprising at least one of a password, a personal identification number, a secret key, a digital certificate, an account number, account information, secret personal information, a response to a personal question, a response to a challenge requiring a separate device to calculate the proper response and biometric data.

20. A credential management system comprising:
- computer implemented means for providing a desktop user environment;
- computer implemented means for providing an application in the desktop user environment, the application requesting a credential;
- computer implemented means for, in response to the application's request, prompting a user to enter a secure attention sequence;
- computer implemented means for switching to a secure environment upon receipt of the secure attention sequence, the secure environment substantially isolated from all user applications running on the desktop user environment;
- computer implemented means for prompting the user to enter the credential in the secure environment;
- computer implemented means for receiving the credential;
- computer implemented means for storing the credential;
- computer implemented means for authenticating identification information associated with the requesting application as unchanged since being signed by a trusted authority;
- computer implemented means for displaying the authenticated identification information of the requesting application to the user via the secure environment, the authenticated identification information being displayed comprising a verified name of the requesting application and an indication that the requesting application is unchanged since being signed by the trusted authority; and
- computer implemented means for selectively providing the credential to the requesting application responsive to permission by the user.

21. The system of claim 1, further comprising prompting receipt of a yes or no user response as the user permission input.

22. A computer program product for facilitating credential management, comprising:
a computer-readable medium comprising:
- a first set of codes for causing a computer to provide a desktop user environment:
- a second set of codes for causing the computer to prompt a user to enter a credential in a secure environment operating on the desktop user environment, the secure environment substantially isolated from all user applications running on the desktop user environment to thwart malicious applications locally executed that can perform spoofing or hooking attacks;
- a third set of codes for causing the computer to receive the credential from the user;
- a fourth set of codes for causing the computer to provide the credential to an operating system;
- a fifth set of codes for causing the computer to store the credential;
- a sixth set of codes for causing the operating system of the computer to authenticate identification information associated with a calling process as unchanged since being signed by a trusted authority;
- a seventh set of codes for causing the computer to display the authenticated identification information of the calling process to the user via the secure environment, the authenticated identification information being displayed comprising a verified name of the calling process and an indication that the calling process is unchanged since being signed by the trusted authority; and
- an eighth set of codes for causing the computer to selectively provide the credential to the calling process responsive to permission by the user.

23. The system of claim 1, wherein the calling process is an application executing in the desktop user environment.

24. The method of claim 13, wherein the calling process is an application executing in the desktop user environment.

* * * * *